United States Patent [19]

Daimon et al.

[11] Patent Number: 4,939,027
[45] Date of Patent: Jul. 3, 1990

[54] ELECTROCONDUCTIVE THERMOPLASTIC RESIN SHEETS AND MOLDED ARTICLES

[75] Inventors: Takashi Daimon; Hideshi Sakamoto; Osamu Akimoto, all of Chiba, Japan

[73] Assignee: Chisso Corporation, Japan

[21] Appl. No.: 376,566

[22] Filed: Jul. 7, 1989

[30] Foreign Application Priority Data

Jul. 8, 1988 [JP] Japan .............................. 63-168952
Sep. 5, 1988 [JP] Japan .............................. 63-220475

[51] Int. Cl.$^5$ .............................................. B32B 5/06
[52] U.S. Cl. ................................... 428/284; 264/257; 428/282; 428/286; 428/297; 428/300
[58] Field of Search ............... 428/284, 296, 282, 286, 428/300, 297; 264/22, 257, 104

[56] References Cited

U.S. PATENT DOCUMENTS 4,532,099 7/1985 Kaji ...................................... 428/296

Primary Examiner—James J. Bell
Attorney, Agent, or Firm—Leydig, Voit & Mayer

[57] ABSTRACT

The present invention provides a thermoplastic resin sheet and its molded article for a packaging material which is heated in a microwave oven and for shielding electromagnetic waves. The above-mentioned resin sheet and molded article are characterized by generating heat when irradiated with microwaves.

The present invention is directed to an electroconductive thermoplastic resin sheet which is prepared by first superposing an electroconductive nonwoven fabric mainly comprising electroconductive fibers and heat-meltable fibers upon one surface, both surfaces, or a part or all of the surface of a thermoplastic resin film as a base material layer, further superposing a thermoplastic resin film as a protective layer upon the nonwoven fabric so that they may come in contact with each other, heating and contact-bonding them at a temperature of the melting point or higher of the heat-meltable fibers. The present invention is also directed to an electroconductive thermoplastic resin-molded article which is prepared by heating the aforesaid electroconductive thermoplastic resin sheet up to a temperature at which the resin sheet softens, setting the resin sheet between a pair of female and male molds, the surface of at least one of which comprises a heat-resistant rubber, and then mating both the molds to mold the resin sheet.

17 Claims, 1 Drawing Sheet

ELECTROCONDUCTIVE THERMOPLASTIC RESIN SHEETS AND MOLDED ARTICLES

BACKGROUND OF THE INVENTION

1. Field of the Invention

The present invention relates to thermoplastic resin sheets and thermoplastic resin-molded articles which can generate heat by the irradiation of microwaves, and it also relates to thermoplastic resin sheets and thermoplastic resin-molded articles having electromagnetic wave shielding properties.

2. Description of the Prior Art

In recent years, many precooked foods ovens are on the market, and as a consequence, various kinds of plastic packaging materials for microwave ovens have been contrived. Among these packaging materials, there is a packaging material prepared by laminating an aluminum-deposited film to a paper and another packaging material having the function to give burns to the surfaces of foods. In the case of the aforesaid laminated packaging material, the microwaves from the microwave oven can be utilized to generate Joule heat, by which the foods can be heated more quickly.

In order to generate the Joule heat by the use of microwaves (frequency 2,450 MHz) from the microwave oven, it is necessary to form the deposited layer of the deposited film extremely thin (about 1/10 of the thickness of the deposited film which has been used in the usual packaging material). However, if it is intended form thin deposited layers, the productivity of these films deteriorates since it is difficult to control the thickness of the deposited layer to such a small thickness; thus the production cost thereof increases. In addition, since the deposited layer has neither ductility nor malleability, deep drawing cannot be applied to these deposited films. The handling of the thin deposited films is difficult, and therefore it is required to laminate each film with another base material. However, a process for this lamination is complex, depending upon the kind of base material.

On the other hand, with the prevalence of electronic equipment such as equipment for office automation, medical equipment, devices for civilian communication and computer equipment, troubles which result from electromagnetic waves radiated from such equipment are serious social problems, and shielding of the electromagnetic waves is strongly demanded.

As techniques of providing housings or the like of the electronic equipment with electromagnetic wave shielding properties, there is a process of molding a resin in which a electroconductive filler is contained at a high concentration and a process of coating the inside walls of resin-molded articles with an electroconductive coating material.

However, in the former process, it is necessary to fill the resin with a great deal of the electroconductive filler, which causes increase in the specific gravity of obtained sheets or molded articles, a deterioration in mechanical characteristics, an increase in cost, a decline in appearance and a deterioration in moldability. Furthermore, the latter process involves problems such as the deterioration in electromagnetic wave shielding properties due to the peeling of the coating films, complex production steps and low productivity. In addition, with regard to the sheets or the molded articles which contain the electroconductive filler at a high concentration or which are coated with the electroconductive coating material containing a large amount of the electroconductive filler as described above, they have no see-through, i.e., are not transparent, and hence do not permit confirmation of the contents therein. Therefore, such sheets, and molded articles cannot be applied to uses in which transparency is required.

SUMMARY OF THE INVENTION

An object of the present invention is to provide a plastic packaging material which can generate heat when irradiated with microwaves from a microwave oven, can be molded into intricate shapes by deep draw, and is excellent in productivity.

Another object of the present case is to provide electroconductive thermoplastic resin sheets and molded articles which can be manufactured by a simple production process and which have excellent electromagnetic shielding properties, low specific gravities, low cost, high mechanical strength and excellent moldability and transparency.

The present invention is directed to an electroconductive thermoplastic resin sheet comprising a first thermoplastic resin film (A); an electroconductive nonwoven fabric composed mainly of electroconductive fibers and heat-meltable fibers superposed on one or both surfaces of, the first thermoplastic film (A); and a second thermoplastic resin film (B) in contact with, said nonwoven fabric as a protective layer; the first thermoplastic film (A), the nonwoven fabric and the second thermoplastic film (B) being heated and contact-bonded at a temperature of the melting point or higher of the heat-meltable fibers.

Furthermore, the present invention is also directed to a molded article prepared from the above-mentioned electroconductive thermoplastic resin sheet, the article being a product having the sheet heated to a softened state, set between a pair of female and male molds at least one of which has a surface made of a heat-resistant rubber, and molded in the molds in a mated state.

The present invention is further directed to an electroconductive thermoplastic sheet or molded article wherein the electroconductive fibers are stainless fibers, copper or copper alloy fibers, synthetic fibers coated with a metal or metal compound, composite synthetic fibers of a metal or metal compound, or mixed fibers thereof.

The present invention is still further directed to an electroconductive thermoplastic sheet or its molded article for a packaging material which may be heated in a microwave oven wherein the electroconductive fibers are used in an amount of 2 to 20 g/m$^2$.

The present invention is also directed to an electroconductive thermoplastic sheet or its molded article for shielding electromagnetic waves wherein the electroconductive fibers are used in an amount of 15 to 50 g/m$^2$.

It is preferred that the heat-resistant rubber set on the surface of at least one of the pressing molds is at least one selected from the group consisting of silicone rubber, acrylic rubber and fluorine-contained rubber.

DETAILED DESCRIPTION OF THE INVENTION

Examples of a thermoplastic resin for thermoplastic resin films (A) and (B) used in the present invention include polyolefin resins such as polyethylene, polypropylene, ethylene-vinyl acetate copolymer and ethyleneethyl acrylate copolymer; styrene resins such as polystyrene, acrylonitrile-butadiene-styrene copolymer and acrylonitrile-styrene copolymer; acrylic resins such as polymethyl methacrylate; polyamide resins such as nylon 6, nylon 66, nylon 12 and nylon 6/12; polyester resins such as polyethylene terephthalate and polybutylene terephthalate; polyvinyl chloride resins, polycarbonates and polyphenylene oxides and mixtures thereof.

In compliance with a purpose, these resins can contain some additives. Examples of the additives include a heat-resistant stabilizer, weathering stabilizer, plasticizer, lubricant, slip agent, antistatic agent, charge transfer type polymer, nucleating agent, flame retardant, tackifier (e.g., petroleum resin), pigment, dye, inorganic filler (e.g., glass fibers, mica or talc) and organic filler (e.g., wood flour, pulp, synthetic fibers or natural fibers).

The thickness of the thermoplastic resin film (A) is not limited particularly, and it can be optionally selected in the range of 0.05 to 5.0 mm.

In the case that the product of the present invention is used as the packaging material for use in a microwave oven, it is desirable that the thermoplastic resin film (B) be as thin as possible from the viewpoint of the heat transfer efficiency to food, but the resin film (B) should have a thickness of at least 0.02 mm. When the thickness of the thermoplastic film (B) is less than 0.02 mm, the electroconductive fiber breaks through the resin layer undesirably in some cases.

Also in the case that the product of the present invention is used for shielding electromagnetic waves, the thickness of the thermoplastic film (B) is not limited particularly, but, in order to prevent electric current from flowing, the thickness of the film (B) should be such that the electroconductive fiber does not break out of the resin layer. In short, the thickness of the thermoplastic film (B) is desirably at least 0.02 mm.

Examples of the heat-meltable fibers for use in the electroconductive nonwoven fabric include acrylic fibers, polyamide fibers, polyester fibers, polyolefin fibers, polyvinyl chloride fibers and mixture thereof, but any fibers can be used without particular limitation, so long as it can be thermally fused to the thermoplastic resin which is the base material, These fibers, if desired, may contain a flame retardant, colorant, antistatic agent and charge transfer type polymer.

In regard to the preferable heat-meltable fibers, its fiber length is from about 5 to about 100 mm, and its fiber diameter is from about 0.5 to about 10 deniers.

Examples of the electroconductive fibers used in the present invention include composite synthetic fibers associated with a metal or metal compound, synthetic fibers coated with a metal or metal compound, carbon fibers coated with a metal or metal compound, glass fibers coated with a metal or metal compound, metallic fibers and combinations thereof. Of these electroconductive fibers, preferable ones are stainless steel fibers, copper or copper alloy fibers, synthetic fibers coated with a metal or metal compound, composite synthetic fibers associated with a metal or metal compound and combinations thereof.

It is desirable that the fiber diameter of the electroconductive fiber is in the range of 5 to 50 $\mu$m. When the fiber diameter of the electroconductive fibers is less than 5 $\mu$m, naps of the fibers are formed undesirably and inversely when it is in excess of 50 $\mu$m, moldability deteriorates undesirably. In the case of the packaging material for use in a microwave oven, the fiber diameter is preferably 20 $\mu$m or less, since the base material layer is thin.

In the case in which the packaging material is used in a microwave oven, it is desirable that the electroconductive fibers are used in an amount of 2 to 20 $g/m^2$. When the amount of the electroconductive fibers are less than 2 $g/m^2$, the sufficient effect of a heat generation cannot be obtained. Similarly, when it is more than 20 $g/m^2$, the effect of the heat generation is not obtained sufficiently.

In the case that the electroconductive thermoplastic sheet or molded article is used to shield electromagnetic waves, it is desirable that the electroconductive fibers are used in an amount of 15 to 50 $g/m^2$, preferably 21 to 50 $g/m^2$. When the amount of the electroconductive fibers is less than 15 $g/m^2$, a sufficient effect of shielding the electromagnetic waves cannot, be obtained. Inversely, when it is more than 50 $g/m^2$, transparency of the electroconductive thermoplastic sheet or molded article deteriorates noticeably, though the electromagnetic wave shielding effect heightens.

The electroconductive nonwoven fabric can be prepared from the above-mentioned electroconductive fibers and heat-meltable fibers in accordance with a known process such as the binder process, needle punching process, hydraulic entangling process using spun bonding, thermal fusing process or wet paper process.

In the case of a packaging material for use in a microwave oven, there is used the electroconductive fibers having a unit weight of 100 $g/m^2$ or less, preferably 10 to 50 $g/m^2$.

In the case of the material, for shielding electromagnetic waves, there is used the electroconductive fibers having a unit weight of 150 $g/m^2$ or less, preferably 20 to 100 $g/m^2$.

The electroconductive nonwoven fabric used in the present invention may be blended, in addition to the heat-meltable fibers and the electroconductive fibers, with high-melting fibers or fibers which do not melt, so long as it does not impair the function of the electroconductive nonwoven fabric.

In the present invention, the three films of the thermoplastic resin film (A) as the base material, the electroconductive nonwoven fabric and the thermoplastic film (B) as the protective layer are superposed together and then fused integrally by a known process such as the extrusion laminating process, hot-roll pressing process or hot-plate press process. At this time, it is necessary that temperature conditions are selected at which the heat-meltable fibers constituting the electroconductive nonwoven fabric is completely melted and is integrated with the base material layer and the protective layer.

In the case of the extrusion laminating process, the thermoplastic resin film (A) as the base material layer is first melted and kneaded at a temperature of about 180° to about 300° C. in an extruder, and is then extruded into the form of a film through a T-die. Next, the electroconductive nonwoven fabric is superposed upon the thermoplastic film (A) in a melting or softening state, and the thermoplastic resin film (B) as the protective layer is further superposed upon the nonwoven fabric so that the film (B) may come in contact with the nonwoven fabric. At this time, the thermoplastic resin film (B) as the protective layer may be previously molded into the form of a film and may be in a molten state. Afterward, the heat-meltable fibers are completely melted by the utilization of the heat of the thermoplastic resin film (A)

or (B), and simultaneously the base material layer, the electroconductive nonwoven fabric and the protective layer are pressed integrally by means of a pair of rolls heated to a temperature of from about 30° to about 120° C. On the other hand, in the case of the hot-roll pressing process, the solidified thermoplastic resin film (A) is superposed upon the electroconductive nonwoven fabric, and the thermoplastic resin film (B) is further superposed upon the nonwoven fabric so that they may be contacted. Simultaneously with or after this operation, a pair of hot rolls having a temperature of from about 100° to about 280° C. is used to press and fuse them integrally.

Next, the electroconductive thermoplastic resin-molded article of the present invention can be prepared by the following procedure.

The above-mentioned electroconductive thermoplastic resin sheet is first heated to a level at which the resin sheet is softened, by the use of a known optional heating technique, and the softened sheet is then fixed between a pair of a female mold and a male mold as shown in FIG. 1. Afterward, these molds are mated under a press pressure of 0.1 to 20 kg/cm² at a mold temperature of about 10° to about 100° C. in order to mold the sheet. In this case, the surface of at least one of the above molds preferably comprises a rubber having such heat resistance that the rubber is protected from deformation, property change and quality deterioration. Preferable examples of such a rubber include a silicone rubber, acrylic rubber and fluorine-containing rubber. In addition, as the base material of the molds, there is used a material having strength sufficient to withstand the press pressure, for example, a wood, gypsum, resin (thermosetting resin), castings or metal. The clearance CL between the female and male molds (at the time when the female and male molds are mated without inserting the electroconductive thermoplastic sheet therebetween) is desirably in the range of $T \geq CL > 0$ mm wherein T is the desired thickness of the molded article, depending upon a draw ratio (a value obtained by dividing the depth of the molded article by the diameter or shorter side of the molded article) of the molds.

FIG. 1 is a cross-sectional elevation of the pair of female and male molds, the female mold being composed only of the base material, the male mold being provided on the surface thereof with a heat-resistant rubber mold portion. In this drawing, the reference designation A is the male mold, B is the female mold, C is the base material, D is the heat-resistant rubber, and E is an air vent.

In this connection, when the above-mentioned electroconductive thermoplastic resin sheet is molded by the vacuum molding process or the pressure molding process when the sheet is inserted so that the protective layer comes in contact with the mold, a phenomenon is observed in which the electroconductive fiber intrudes into the base material layer in corners of the molded article some cracks occur. In contrast, when the electroconductive thermoplastic sheet is inserted so that the base material layer comes in contact with the mold, the electroconductive fiber breaks through the protective layer and comes out partially in corners of the molded article undesirably.

Moreover, also in the case of a press molding method the same phenomenon as in the vacuum molding process and the pressure molding process takes place undesirably, when the clearance between the female and male molds is greater than the thickness of the electroconductive thermoplastic resin sheet.

As will be apparent from the examples described, hereinafter, when the packaging material for use in a microwave oven, is formed the electroconductive thermoplastic sheet can be prepared by sandwiching the electroconductive nonwoven fabric made of the electroconductive fibers and the heat-meltable fibers between the thermoplastic resin film (A) as the base material and the thermoplastic resin film (B) as the protective layer, and then melting and integrally pressing them, or when the molded article is formed which can be prepared by molding the above-mentioned sheet in a specific manner, the heating time can be shortened, and burns can be given on foods. These and other excellent functions of the present invention are what cannot be obtained by conventional plastic packaging materials. In addition, the above-mentioned sheet and molded article are excellent in productivity and hence are inexpensive, and for these reasons, they can be suitably utilized as disposable packaging materials for use in a microwave oven which are used in homes.

Figure 1:
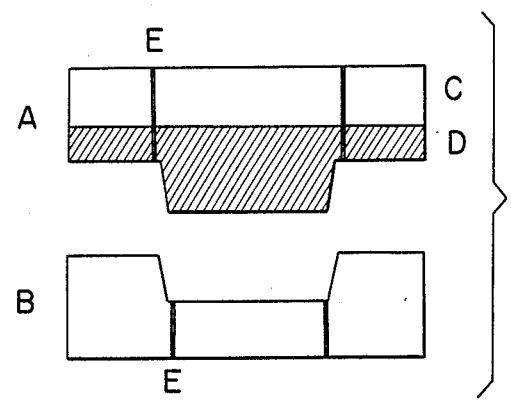

With regard to the electroconductive thermoplastic resin sheet prepared by first superposing the electroconductive nonwoven fabric mainly comprising the electroconductive fibers and the heat-meltable fibers upon either surface or both surfaces of the thermoplastic resin film (A) as the base material layer, further superposing the thermoplastic resin film (B) as the protective layer upon the nonwoven fabric so that they may come in contact with each other, and then heating and pressing them at a temperature of the melting point or higher of the heat-meltable fibers, and with regard to the molded article prepared by molding the electroconductive thermoplastic resin sheet in a specific manner, they are excellent in productivity, and have a low specific gravity, high mechanical strength, good moldability, satisfactory, electromagnetic wave shielding effect and excellent transparency. Therefore, the above-mentioned electroconductive thermoplastic resin sheet and molded article can be suitably applied to casings for floppy disks, CD's and IC cards, shielding materials for CRT's, partitions for shielded rooms and clean rooms, and shielding materials for housings of electronic equipment.

EXAMPLES

Now, the present invention will be described in detail with reference to examples, and comparative examples, but the scope of the present invention should not be limited by these examples.

Examples 1 to 3 and Comparative Examples 1 to 3

In each experiment, upon one surface of a nylon 6 film having a thickness of 150 μm and a width of 500 mm was superposed an electroconductive nonwoven fabric having a unit weight of 30 g/m² and a width of 450 mm which had been formed by mixing nylon 6 fibers having a fiber diameter of 2 deniers and a fiber length of 51 mm with austenite stainless steel fibers having a fiber diameter of 8 μm and a fiber length of 45 mm in a ratio shown in Table 1 in the presence of an acrylic resin as a binder.

Afterward, a nylon 6 film having a thickness of 30 μm and a width of 500 mm was further superposed upon the nonwoven fabric, and they were then passed between a pair of hot rolls which were heated up to 240° C., in order to fuse them integrally, thereby obtaining an electroconductive nylon sheet. The thus obtained sheet was then put on the turn table of a microwave oven, with the protective layer of the sheet upward, and a paper cup containing 25 cm$^3$ of salad oil was put on the sheet. After the salad oil was irradiated with microwaves for a certain period of time, the temperature of the salad oil was measured. The results are set forth in Table 1.

The results in this table indicate that the electroconductive nylon sheet, in which the electroconductive nonwoven fabric containing a certain amount of the stainless steel fiber was used, served to heat the salad oil in a short period of time, when irradiated with the microwaves.

TABLE 1

|  | Nylon 6 Fibers (g/m$^2$) | Stainless Fibers (g/m$^2$) | Temp. of Salad Oil (°C.) | |
|---|---|---|---|---|
|  |  |  | Irradiation with Microwaves for 3 min. | Irradiation with Microwaves for 5 min. |
| Example 1 | 27 | 3 | 185 | 210 |
| Example 2 | 20 | 10 | 180 | 200 |
| Example 3 | 15 | 15 | 170 | 190 |
| Comparative Example 1 | 30 | — | 110 | 140 |
| Comparative Example 2 | 29 | 1 | 115 | 145 |
| Comparative Example 3 | 5 | 25 | 120 | 155 |

Example 4

An electroconductive nonwoven fabric was obtained by the heat fusing process from 6 g/m$^2$ of composite fibers (fiber diameter 3 deniers and fiber length 51 mm) comprising a core component of a crystalline propylene homopolymer (MFR =22 g/10 min.) and a sheath component of propylene-ethylene-butene-1 random copolymer (ethylene content 5.0 wt%, butene-1 content 4.5 wt%; MFR =12 g/10 min.), and 4 g/m$^2$ of electroconductive composite synthetic fibers comprising acrylic regular fibers (Cashimilon FK manufactured by Asahi Chemical Industry Co., Ltd.; fiber diameter 2 deniers and fiber length 51 mm) having an adsorbed copper compound on the surface thereof.

On the other hand, polypropylene pellets were prepared by first mixing 79.7% by weight of crystalline propylene homopolymer (MFR =2.5 g/10 min.) with 20% by weight of phlogopite $KMg_3(AlSi_3O_{10})(OH)_2$ (which was passed through 200 meshes), 0.1% by weight of tris(2,4-di-t-butylphenyl)phosphite, 0.1% by weight of tetrakis[methylene(3,5-di-t-butyl-4-hydroxyhydrocinnamate)]methane and 0.1% by weight of calcium stearate, and then melting, kneading the resulting mixture, and extruding. The thus prepared pellets were then melted and kneaded by an extruder having a bore diameter of 65 mm and were then extruded through a T-die having a width of 600 mm at a resin temperature of 250° C. into the form of a film, thereby obtaining a polypropylene sheet having a thickness of 0.8 mm. Next, the above-mentioned electroconductive nonwoven fabric (which was cut in a size of 130 mm wide and 70 mm long) was superposed upon a part of one surface of the above-mentioned polypropylene sheet, and a polypropylene film having a thickness of 25 μm was further superposed upon the nonwoven fabric so that they might come in contact with each other. Afterward, they were fused integrally by the use of a pair of hot rolls which were heated up to 170° C., in order to obtain a polypropylene sheet in which its central portion was only laminated with the electroconductive nonwoven fabric.

Figure 2:
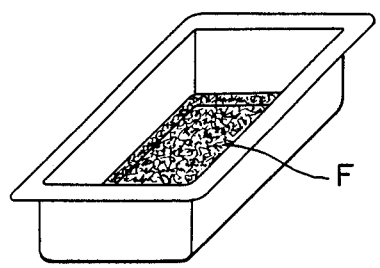
FIG. 2 is a perspective view of one example of a packaging material for a microwave oven which has been press-molded. The reference designation F in this drawing indicates the electroconductive fibers.

The thus obtained sheet was heated to soften itself, and was then inserted between molds shown in FIG. 1. The upper and lower molds were then mated under a press pressure of 7 kg/cm$^2$G in order to prepare a molded rectangular tray having dimensions 120 mm wide, 60 mm long and 30 mm deep, as shown in FIG. 2. In this case, the molding was performed with the laminated portion of the electroconductive nonwoven fabric positioned o the bottom of the tray. Furthermore, a silicone rubber (hardness 60) was mounted on the surface of the male mold, and a clearance (CL) between the female and male molds was from 0.5 to 0.7 mm.

Stew at room temperature was then poured into the tray, and this tray containing the stew was put on the turn table of a microwave oven, followed by irradiating microwaves. As a result, the temperature of the stew reached 80° C. in about 1 minute. For comparison, a similar test was carried out using a tray made of a polypropylene sheet in which no electroconductive nonwoven fabric was contained. In this case, a time of about 2 minutes, which was about twice as much as the above case, was taken until the temperature of the stew reached 80° C.

Comparative Example 4

The same electroconductive polypropylene sheet as used in Example 4 was heated to soften itself, and was then vacuum-molded under the conditions that a protective layer did not come in contact with a mold, in order to obtain a rectangular tray which was 120 mm wide, 60 mm long and 30 mm deep (the mold used was a female mold). When molding was carried out, the laminated portion of the electroconductive nonwoven fabric was positioned on the bottom of the tray.

However, in the vicinity of corners of the tray, the electroconductive fiber broke through the protective layer and came out. This means that the tray was not practical.

Comparative Example 5

The same electroconductive polypropylene sheet as used in Example 4 was heated to soften itself, and was then vacuum-molded under the conditions that a protective layer came in contact with a mold, in order to obtain a rectangular tray which was 120 mm wide, 60 mm long and 30 mm deep (the used mold was a male mold). When molding was carried out, the laminated portion of the electroconductive nonwoven fabric was positioned on the bottom of the tray.

However, in the vicinity of corners of the tray, the electroconductive fiber thrust into the protective layer and cracks occurred. This means that the tray was not practical.

Comparative Example 6

The same electroconductive polypropylene sheet and the electroconductive nonwoven fabric as used in Example 4 were superposed upon each other, and a polypropylene nonwoven fabric, which had a unit weight of 25 g/m² and which was mainly composed of ethylene-propylene random copolymer containing 3.5% by weight of ethylene, was further superposed upon the electroconductive nonwoven fabric so that they might come in contact with each other. They were then fused integrally by the use of a pair of hot rolls which were heated up to 170° C., in order to obtain an electroconductive polypropylene sheet. The thus obtained sheet was put on the turn table of a microwave oven, with the fused surface of the nonwoven fabric upward, and a paper cup containing 25 cm³ of salad oil was put on the sheet and was then irradiated with microwaves for a certain period of time. As a result, as the temperature of the sheet rose, the fused surface of the nonwoven fabric shrank, with the result that the sheet warped so excessively that it could not be used practically.

Examples 5 and 6, Comparative Examples 7 to 10

In each experiment, upon one surface of a rigid vinyl chloride sheet having a thickness of 0.8 mm and a width of 500 mm was superposed an electroconductive nonwoven fabric having a width of 450 mm which had been formed by mixing vinyl chloride fibers (Teviron manufactured by Teijin Limited) having a fiber diameter of 2 deniers and a fiber length of 51 mm with austenite stainless steel fibers (NASLON manufactured by Nippon Seisen Co., Ltd.) having a fiber diameter of 8 μm and a fiber length of 35 mm in a ratio shown in Table 2 in the presence of an acrylic resin as a binder.

Afterward, a rigid vinyl chloride film having a thickness of 0.2 mm and a width of 500 mm was further superposed upon the nonwoven fabric, and they were passed between a pair of hot rolls which were heated up to 180° C., in order to fuse the three layers integrally, thereby obtaining an electroconductive vinyl chloride sheet. For the thus obtained sheet, the effect of shielding electromagnetic waves was then measured. The results are set forth in Table 2.

The results in this table indicate that the electroconductive vinyl chloride sheet, in which the electroconductive nonwoven fabric containing a certain amount of the stainless steel fiber was used, had sufficient electromagnetic wave shielding effect and was excellent in transparency.

In this connection, the electromagnetic wave shielding effect was evaluated by measuring the sheet having a sample size of 150 mm × 150 mm in accordance with the Advantest procedure (MIL-STD-285) by the use of an apparatus having a spectrum analyzer TR4172, a plotter 7470A and a plastic shielding material-evaluating device TR1730. Furthermore, the transparency was measured by an automatic digital hazemeter manufactured by Nippon Denshoku Kogyo Co., Ltd. (in, accordance with NDH-20D, ASTM-D-1003), and was noted in terms of the total light transmission.

TABLE 2

| | Vinyl Chloride Fibers (g/m²) | Stainless Fibers (g/m²) | Shielding Effect in Electric Field (dB) | | Light Transmission (%) |
|---|---|---|---|---|---|
| | | | 300 MHz | 500 MHz | |
| Example 5 | 40 | 25 | 38 | 32 | 72 |
| Example 6 | 55 | 40 | 48 | 42 | 61 |
| Comparative Example 7 | 20 | — | 0 | 0 | 92 |
| Comparative Example 8 | 10 | 3 | 22 | 15 | 88 |
| Comparative Example 9 | 20 | 10 | 29 | 25 | 82 |
| Comparative Example 10 | 100 | 80 | 60 | 57 | 28 |

Example 7

An electroconductive nonwoven fabric was obtained by the heat fusing process from 15 g/m² of a composite fibers (fiber diameter 3 deniers and fiber length 51 mm) comprising a core component of a crystalline propylene homopolymer (MFR =22 g/10 min.) and a sheath component of propylene-ethylene-butene-1 random copolymer (ethylene content 5.0 wt%; butene-1 content 4.5 wt%; MFR =12 g/10 min.), and 25 g/m² of austenite stainless steel fibers having a fiber diameter of 8 μm and a fiber length of 35 mm (NASLON manufactured by Nippon Seisen Co., Ltd.).

In addition, polypropylene pellets were prepared by first mixing 99.45% by weight of crystalline propylene homopolymer (MFR =2.5 g/10 min.) with 0.25% by weight of 1·3,2·4-bis(p-methylbenzylidene)sorbitol, 0.1% by weight of tris(2,4-di-t-butylphenyl)phosphite, 0.1% by weight of tetrakis[methylene(3,5-di-t-butyl-4-hydroxyhydrocinnamate)]methane and 0.1% by weight of calcium stearate, and then melting and kneading the resulting mixture, and extruding. The thus prepared pellets were then melted and kneaded by an extruder having a bore diameter of 65 mm and were extruded through a T-die having a width of 600 mm at a resin temperature of 250° C. into the form of a film, thereby obtaining a polypropylene sheet having a thickness of 1.2 mm. Next, the above-mentioned electroconductive nonwoven fabric was superposed upon one surface of the above obtained sheet, and a polypropylene film having a thickness of 50 μm was further superposed upon the nonwoven fabric so that they might come in contact with each other. Afterward, they were fused integrally by the use of a pair of hot rolls which was heated up to 170° C., in order to obtain an electroconductive polypropylene sheet.

Figure 3:
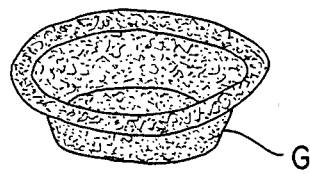
FIG. 3 is a perspective view of one example of a cylindrical tray, for shielding electromagnetic waves, and the reference designation G in this drawing denotes the electroconductive fibers.

The thus obtained sheet was heated to soften itself, and was then inserted between molds shown in FIG. 1. The upper and lower molds were then mated under a press pressure of 7 kg/cm²G in order to prepare a molded cylindrical tray having a diameter of 350 mm and a depth of 80 mm as shown in FIG. 3. In this drawing, the reference designation G denotes electroconductive fibers. In this case, silicone rubber (hardness 60) was mounted on the surface of the male mold, and the clearance (CL) between the male and female molds was from 0.9 to 1.1 mm.

Next, a box was made by using two of the thus molded articles, and in this box, there was placed a radiation source for electromagnetic waves having an electric field strength of 4,000 μV/m in a frequency zone of 100 to 300 MHz. A dipole antenna was positioned 3 meters apart from the box, and as a result of measurement, an electric field strength at this position was 82 μV/m. In consequence, it is apparent that the molded article of the present invention has an excellent electromagnetic wave shielding effect. In addition, the total light transmission of the molded article was 75%, which meant that it was also excellent in transparency.

Comparative Example 11

The same electroconductive polypropylene sheet as used in Example 7 was heated to soften itself, and was then vacuum-molded under the conditions that a protective layer did not come in contact with a mold, in order to obtain a molded cylindrical tray having a diameter of 350 mm and a depth of 80 mm (the used mold was a female mold).

However, in the vicinity of corners of the tray, the electroconductive fiber broke through the protective layer and came out. This means that the tray was not practical.

Comparative Example 12

The same electroconductive polypropylene sheet as used in Example 7 was heated to soften itself, and was then vacuum-molded under the conditions that a protective layer came in contact with a mold, in order to obtain a molded cylindrical tray having a diameter of 350 mm and a depth of 80 mm.

However, in the vicinity of corners of the tray, the electroconductive fiber thrust into the protective layer and cracks occurred. This means that the tray was not practical.

What is claimed is:

1. An electroconductive thermoplastic resin sheet comprising a first thermoplastic resin film; an electroconductive nonwoven fabric composed mainly of electroconductive fibers and heat-meltable fibers superposed on one or both surfaces of said first thermoplastic film; and a second thermoplastic resin film in contact with said nonwoven fabric as a protecting layer, said first thermoplastic film, said nonwoven fabric and said second thermoplastic film being heated and contact-bonded at a temperature of the melting point of said heat-meltable fibers or higher.

2. A molded article prepared from an electroconductive thermoplastic resin sheet according to claim 1, said molded article being a product having said sheet heated to a softened state, set between a pair of female and male molds, at least one of which has a surface made of a heat-resistant rubber, and molded in said molds in a mated state.

3. An electroconductive thermoplastic resin sheet according to claim 1 wherein said electroconductive fibers are stainless steel fibers, copper or copper alloy fibers, synthetic fibers coated with a metal or metal alloy, composite synthetic fibers associated with a metal or metal compound, or mixed fibers thereof.

4. A molded article according to claim 2 wherein said electroconductive fibers are stainless steel fibers, copper or copper alloy fibers, synthetic fibers coated with a metal or metal alloy, composite synthetic fibers associated with a metal or metal compound and mixed fibers thereof.

5. An electroconductive thermoplastic resin sheet according to claim 1 wherein said electroconductive fibers are used in an amount of 15 to 50 g/m².

6. A molded article according to claim 2 wherein said electroconductive fibers are used in an amount of 15 to 50 g/m².

7. An electroconductive thermoplastic resin sheet comprising a first thermoplastic resin film; an electroconductive nonwoven fabric composed mainly of electroconductive fibers and heat-meltable fibers superposed on part of one surface of said first thermoplastic film; and a second thermoplastic resin film in contact with said nonwoven fabric as a protecting layer, said first thermoplastic film, said nonwoven fabric and said second thermoplastic film being heated and contact-bonded at a temperature of the melting point or higher of said heat-meltable fibers.

8. A molded article from an electroconductive thermoplastic resin sheet according to claim 7, said molded article being a product having said sheet heated to a softened state, set between a pair of female and male molds, at least one of which has a surface made of a heat-resistant rubber, and molded in said molds in a mated state.

9. An electroconductive thermoplastic resin sheet according to claim 7 wherein said electroconductive fibers are stainless steel fibers, copper or copper alloy fibers, synthetic fibers coated with a metal or metal alloy, composite synthetic fibers associated with a metal or metal compound, or mixed fibers thereof.

10. An electroconductive thermoplastic resin molded article according to claim 8 wherein said electroconductive fibers are stainless steel fibers, copper or copper alloy fibers, synthetic fibers coated with a metal or metal alloy, composite synthetic fibers associated with a metal or metal compound, or mixed fibers thereof.

11. An electroconductive thermoplastic resin sheet according to claim 7 wherein said electroconductive fibers are used in an amount of 2 to 20 g/m².

12. A molded article according to claim 8 wherein said electroconductive fibers are used in an amount of 2 to 20 g/m².

13. An electroconductive thermoplastic resin molded article according to claim 2 wherein said heat-resistant rubber is one selected from the group consisting of a silicone rubber, acrylic rubber and fluorine-contained rubber.

14. An electroconductive thermoplastic resin molded article according to claim 8 wherein said heat-resistant rubber is one selected from the group consisting of a silicone rubber, acrylic rubber and fluorine-contained rubber.

15. An electroconductive thermoplastic resin sheet according to claim 1 wherein said electroconductive fibers have diameters in the range of about 5 to about 50 μm.

16. An electroconductive thermoplastic resin sheet according to claim 7 wherein said electroconductive fibers have diameters in the range of about 5 to about 50 μm.

17. A molded article according to claim 2 wherein said electroconductive fibers have diameters in the range of about 5 to about 50 μm.

* * * * *